(12) United States Patent
Hollaender et al.

(10) Patent No.: US 10,309,816 B2
(45) Date of Patent: Jun. 4, 2019

(54) METHODOLOGIES AND APPARATUS FOR THE RECOGNITION OF PRODUCTION TESTS STABILITY

(71) Applicant: Schlumberger Technology Corporation, Sugar land, TX (US)

(72) Inventors: Florian Hollaender, Issy les Moulineaux (FR); Stephan den Bleker, Ijmuiden (NL)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 557 days.

(21) Appl. No.: 14/830,694

(22) Filed: Aug. 19, 2015

(65) Prior Publication Data
US 2016/0054162 A1 Feb. 25, 2016

Related U.S. Application Data

(60) Provisional application No. 62/040,584, filed on Aug. 22, 2014.

(51) Int. Cl.
*G01F 1/36* (2006.01)
*G01F 1/74* (2006.01)
(Continued)

(52) U.S. Cl.
CPC ............... *G01F 1/74* (2013.01); *G01F 1/36* (2013.01); *G01F 1/44* (2013.01); *G01F 15/06* (2013.01); *G01F 15/063* (2013.01)

(58) Field of Classification Search
CPC ..... G01F 1/74; G01F 1/36; G01F 1/44; G01F 15/06; G01F 15/063
See application file for complete search history.

(56) References Cited

U.S. PATENT DOCUMENTS 5,004,152 A 4/1991 Baker et al.
5,198,989 A * 3/1993 Petroff .................... G01F 1/002
702/48

(Continued)

FOREIGN PATENT DOCUMENTS

WO 2015040607 A1 3/2015

OTHER PUBLICATIONS

Combines Search and Examination Report under Section 17 & 18(3) issued Feb. 22, 2016 in the corresponding GB application 1514856.2 (5 pages).

(Continued)

*Primary Examiner* — Matthew G Marini
(74) *Attorney, Agent, or Firm* — Cameron R. Sneddon

(57) ABSTRACT

A method for analyzing flow of a fluid through a flowmeter is provided. In an embodiment, the method includes receiving multiphase flowmeter data representative of a characteristic of a multiphase fluid flowing through a multiphase flowmeter and segmenting the multiphase flowmeter data into time blocks. The data in the time blocks can be analyzed using time-domain analysis or frequency-domain analysis to determine flow stability. The time-domain analysis can include analyzing time blocks in a time domain to determine whether measurement distribution in the multiphase flowmeter data of the analyzed time blocks represents stable flow of the multiphase fluid. The frequency-domain analysis can include converting the multiphase flowmeter data of the time blocks from a time domain to a frequency domain and identifying time blocks in which contribution of low-frequency components in the frequency domain is below a contribution threshold. Additional systems, devices, and methods are also disclosed.

14 Claims, 8 Drawing Sheets

(51) Int. Cl.
    *G01F 1/44*    (2006.01)
    *G01F 15/06*    (2006.01)

(56) References Cited

U.S. PATENT DOCUMENTS

| | | | |
|---|---|---|---|
| 9,528,334 B2* | 12/2016 | Davis | ............ E21B 44/00 |
| 2004/0261539 A1 | 12/2004 | Umekage et al. | |
| 2010/0023269 A1 | 1/2010 | Yusti et al. | |
| 2011/0295510 A1* | 12/2011 | Gulati | ............ G01V 1/28 |
| | | | 702/16 |

OTHER PUBLICATIONS

T.H.J.J. van der Hagen, et al., "Interpretation of velocities determined by noise analysis for various void fractions and flow regimes in two-phase flow," Progress in Nuclear Energy, 1988, vol. 21, pp. 565-573.

T.H.J.J. van der Hagen, et al, "Fast measurements of the in-core coolant velocity in a bwr by neutron noise analysis," Annals of Nuclear Energy, 1988, vol. 15, No. 9, pp. 439-448.

Y.K. Suman, et al., "Use of digital signal analysis to identify slug flow in a narrow vertical pipe," Chemical Engineering Communications, 2010, 197, pp. 1287-1302.

O.C. Jones Jr, et al, "The interrelation between void fraction fluctuations and flow patterns in two-phase flow," International Journal of Multiphase Flow, 1975, vol. 2, Issue 3, pp. 273-306.

O.C. Jones Jr, et al, "Transient and statistical measurement techniques for two-phase flows: a critical review," International Journal of Multiphase Flow, 1976, vol. 3, Issue 2, pp. 89-116.

\* cited by examiner

METHODOLOGIES AND APPARATUS FOR THE RECOGNITION OF PRODUCTION TESTS STABILITY

CROSS-REFERENCE TO RELATED APPLICATIONS

This application claims priority to U.S. Provisional Patent Application No. 62/040,584 filed Aug. 22, 2014, which is herein incorporated by reference.

BACKGROUND

Field

This disclosure relates to well testing and more particularly to methods and apparatuses for performing and interpreting production test measurements.

Description of the Related Art

Hydrocarbon fluids such as oil and natural gas are obtained from a subterranean geologic formation, referred to as a reservoir, by drilling a well that penetrates the hydrocarbon-bearing formation. Once a wellbore is drilled, the well may be tested for purposes of determining the reservoir productivity and other properties of the subterranean formation to assist in decision making for field development. Various components and equipment may be installed in order to monitor and conduct flow tests while producing the various fluids from the reservoir.

Well testing is done to provide reservoir characterization, estimation of well deliverability, evaluation of well completion and perforation strategy, and assess efficiency of performed operations on a well, such as drilling, completion, perforation, stimulation, etc. During a well test, one parameter obtained is the flow rate measured at the surface. Various types of analysis may be performed on the results of the flow tests to determine formation, fluid, and flow characteristics, such as on the data measured using flowmeters. Wells often produce a combination of water, oil and gas, making flow rate measurements rather complex.

One conventional way of measuring the flow rate is by separating fluid phases in a multiphase flow and then measuring the individual phases with single phase flowmeters. Separation into and measuring of single phase flows are generally considered very accurate. Although single phase flow measurements are generally trustworthy, a difficulty arises when separation of the fluids is incomplete, thus providing a mixture of fluid phases (e.g., gas bubbles in oil) to be measured by a single phase flowmeter and inaccurate results. Another potential drawback is that a lot of information about the behavior of the fluid flow in the production well may be missed, as fluid flow rate is measured after separation. Consequently, the desire arose to measure the multiphase flow rate before separation using a multiphase flowmeter. However, multiphase flow measurement is very complex and its development for industrial use has been relatively recent.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In an embodiment of the present disclosure, a method includes receiving multiphase flowmeter data that represents a characteristic of a multiphase fluid flowing through a multiphase flowmeter and segmenting the data into time blocks. The method also includes analyzing the segmented multiphase flowmeter data in the time blocks using time-domain analysis or frequency-domain analysis to determine stability of the flow of the multiphase fluid through the multiphase flowmeter. The time-domain analysis, if used, includes analyzing at least some of the time blocks in a time domain to determine whether measurement distribution in the multiphase flowmeter data of the analyzed time blocks represents stable flow of the multiphase fluid through the multiphase flowmeter. The frequency-domain analysis, if used, includes converting the data in at least some of the time blocks from the time domain to a frequency domain. The data in the frequency domain can include low-frequency components below a frequency threshold and high-frequency components above the frequency threshold. The frequency-domain analysis also includes identifying time blocks in which contribution of the low-frequency components in the frequency domain is below a contribution threshold.

In another embodiment of the present disclosure, an apparatus includes a fluid conduit and a sensor coupled to the fluid conduit for measuring a characteristic of a multiphase fluid produced from a well and routed through the fluid conduit during a well production test. Further, the apparatus includes a computer for analyzing the multiphase fluid characteristic measured by the sensor to determine a flow rate of the multiphase fluid through the fluid conduit, and also for determining flow stability of the well production test through analysis of the measured characteristic in both time and frequency domains.

In an additional embodiment, a method includes analyzing measurements acquired with a multiphase flowmeter, the measurements indicative of a flow characteristic of a fluid routed through the multiphase flowmeter during a well production test. Analyzing the measurements includes segmenting the measurements and analyzing the segmented measurements in both time and frequency domains. The method also includes determining, without analyst intervention, whether the well production test can be considered stable based on the analysis of the segmented measurements in both the time and frequency domains.

Various refinements of the features noted above may exist in relation to various aspects of the present embodiments. Further features may also be incorporated in these various aspects as well. These refinements and additional features may exist individually or in any combination. For instance, various features discussed below in relation to the illustrated embodiments may be incorporated into any of the above-described aspects of the present disclosure alone or in any combination. Again, the brief summary presented above is intended just to familiarize the reader with certain aspects and contexts of some embodiments without limitation to the claimed subject matter.

BRIEF DESCRIPTION OF THE DRAWINGS

Certain embodiments of the disclosure will hereafter be described with reference to the drawings, wherein like reference numerals denote like elements. It should be understood, however, that the accompanying drawings illustrate just the various implementations described herein and are not meant to limit the scope of various technologies described herein. The drawings show and describe various embodiments of the current disclosure. More specifically.

DETAILED DESCRIPTION

In the following description, numerous details are set forth to provide an understanding of the present disclosure. It will be understood by those skilled in the art, however, that the embodiments of the present disclosure may be practiced without these details and that numerous variations or modifications from the described embodiments may be possible.

In the specification and appended claims: the terms "connect," "connection," "connected," "in connection with," and "connecting" are used to mean "in direct connection with" or "in connection with via one or more elements," and the term "set" is used to mean "one element" or "more than one element." Further, the terms "couple," "coupling," "coupled," "coupled together," and "coupled with" are used to mean "directly coupled together" or "coupled together via one or more elements." As used herein, the terms "up" and "down"; "upper" and "lower"; "upwardly" and "downwardly"; "upstream" and "downstream"; "above" and "below"; and other like terms indicating relative positions above or below a given point or element are used in this description to more clearly describe some embodiments of the disclosure. When introducing elements of various embodiments, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure generally relate to fluid analysis, such as fluid analysis of produced fluids during well production tests. More particularly, some embodiments include performing specific analysis of raw measurements acquired by multiphase meters related to the total flow occurring through the meter to determine whether a production test can be considered as stable (or not) without analyst intervention, but processed data (e.g., flow rates, fractions, or ratios) could also or instead be analyzed to determine production test stability without analyst intervention. In an embodiment, a method includes analyzing blocks of data using several mathematical methods based on probability distribution functions as well as frequency-domain conversion of time series to assess whether flows that are potentially unstable over short periods of time (i.e., showing significant variations in responses between successive time steps) are in fact showing a pseudo steady-state behavior that is characteristic of developed flows with a repeating behavior over the long term and truly representative of a well or pipeline performance.

Figure 1:
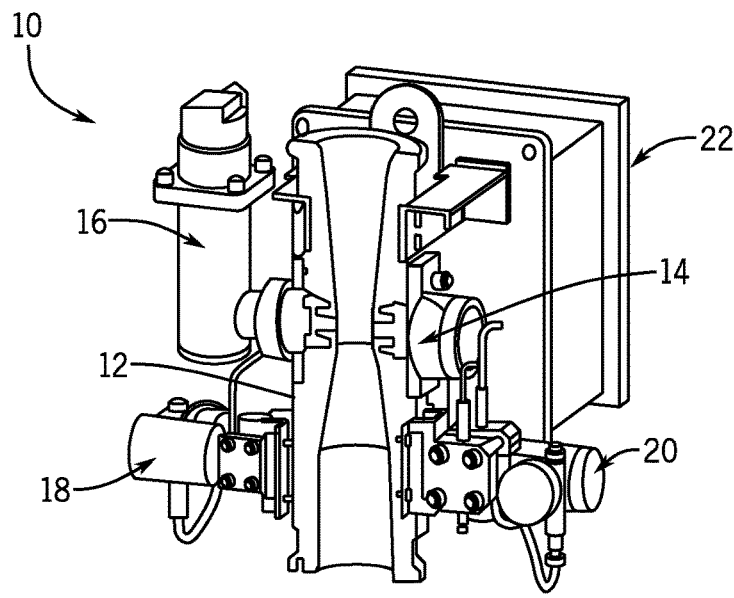
FIG. 1 generally depicts a flowmeter for analyzing a fluid in accordance with an embodiment of the present disclosure.

Turning now to the drawings, an apparatus 10 for analyzing fluid is generally depicted in FIG. 1 in accordance with an embodiment. While certain elements of the apparatus 10 are depicted in this figure and generally discussed below, it will be appreciated that the apparatus 10 may include other components in addition to, or in place of, those presently illustrated and discussed. Moreover, while the apparatus 10 may be provided in the form of a flowmeter (e.g., a multiphase flowmeter) as shown here and described below in connection with certain embodiments, the apparatus 10 could be provided in other forms as well. Further, in at least some instances the apparatus 10 is used to analyze fluids drawn from subterranean formations. Such analysis could be performed on fluids by the apparatus 10 downhole within a well or at the surface.

As depicted, the apparatus includes a fluid conduit 12 for receiving a fluid to be analyzed and various sensors coupled to the fluid conduit 12 for measuring a characteristic of the fluid in the conduit 12. In the presently depicted embodiment, the sensors include a radiation detector 16 (which receives radiation from an emitter 14), a pressure transmitter 18, and a differential-pressure transmitter 20. The emitter 14 can emit electromagnetic radiation into the fluid, at least some of which is received by the radiation detector 16. In at least an embodiment, the emitter 14 includes a nuclear source (e.g., Barium-133) that emits nuclear radiation through the fluid to the radiation detector 16.

To facilitate certain measurements, such as flow rate, the fluid conduit 12 may be provided as a Venturi section having a tapered bore (e.g., a Venturi throat) to constrict fluid flow, as shown in FIG. 1. This constriction creates a small pressure drop, which is measured with the differential-pressure transmitter 20. Further, in at least an embodiment the emitter 14 and detector 16 are positioned about a Venturi throat in the fluid conduit 12 such that the detector 16 receives radiation that has been transmitted through fluid within the Venturi throat.

In some embodiments, the apparatus 10 is a multiphase flowmeter that uses radiation at two or more different energy levels or wavelengths. As one example, the apparatus 10 may use gamma radiation (e.g., emitted across the Venturi throat) at two different energy levels. The attenuation of the radiation may be measured and used to determine individual phase fractions of oil, gas, and water in a multiphase fluid routed through the flowmeter. The individual phase fractions and the differential pressure can be used to determine other fluid characteristics, such as mixture density, water—liquid ratio, and mass flow rate.

The apparatus 10 also includes a computer 22 (which may also be referred to as a controller or a control unit) for determining characteristics of fluid within the fluid conduit 12. In at least some embodiments, the computer 22 is provided in the form of a flow computer coupled with the other depicted components in a single unit to facilitate installation of a flowmeter in a larger system (e.g., an oilfield apparatus). More specifically, the computer 22 is operable to determine characteristics of fluids within the fluid conduit 12 from measurements collected by the other components. For example, the computer 22 can determine pressure and flow rate of the fluid. Further, a computer 22 of a multiphase flowmeter can determine attenuation by the fluid of various levels of radiation by comparing the amount of radiation emitted from the emitter 14 to the portion of such radiation actually received by the detector 16. The computer 22 can also use this information to calculate phase fractions (e.g., proportions of oil, gas, and water) for a multiphase fluid within the fluid conduit 12. Single-phase flow rates can be achieved by combining the phase fraction measurements together with the total flow rate measurement. And as described below, in at least some embodiments the computer 22 analyzes flow data in both time and frequency domains to ascertain stability of fluid flow through the apparatus 10 (e.g., flow of a multiphase fluid produced from a well during a production test).

Figure 2:
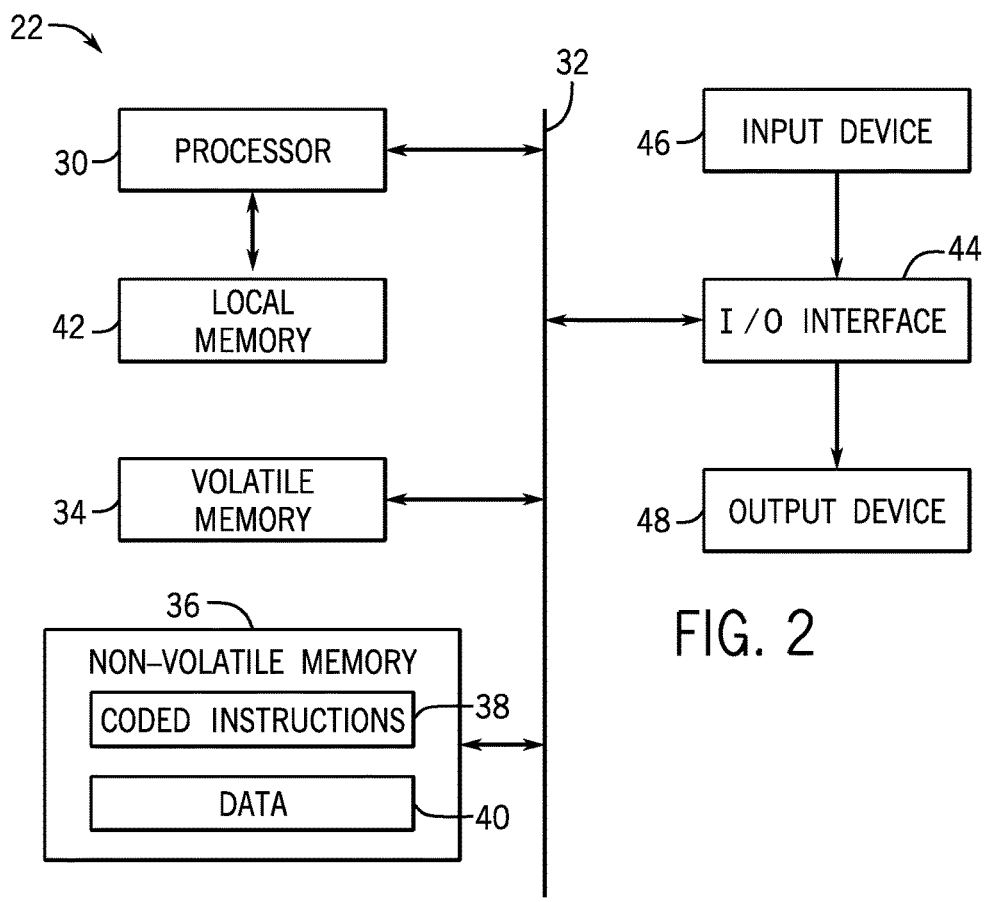
FIG. 2 is a block diagram of components of a computer of the flowmeter of FIG. 1 in accordance with an embodiment.

The computer 22 can be a processor-based system, an example of which is provided in FIG. 2. In this depicted embodiment, the computer 22 includes at least one processor 30 connected by a bus 32 to volatile memory 34 (e.g., random-access memory) and non-volatile memory 36 (e.g., flash memory and a read-only memory (ROM)). Coded application instructions 38 and data 40 are stored in the non-volatile memory 34. For example, the application instructions 38 can be stored in a ROM and the data 40 can be stored in a flash memory. The instructions 38 and the data 40 may be also be loaded into the volatile memory 34 (or in a local memory 42 of the processor) as desired, such as to reduce latency and increase operating efficiency of the computer 22. The coded application instructions 38 can be provided as software that may be executed by the processor 30 to enable various functionalities described herein. Non-limiting examples of these functionalities include determination of incident photon count rates on a detector, calculation of attenuation rates and phase fractions for a fluid, determination of flow rate, and analysis of flow stability through the flowmeter (e.g., during a production test). In at least some embodiments, the application instructions 38 are encoded in a non-transitory computer readable storage medium, such as the volatile memory 34, the non-volatile memory 36, the local memory 42, or a portable storage device (e.g., a flash drive or a compact disc).

An interface 44 of the computer 22 enables communication between the processor 30 and various input devices 46 and output devices 48. The interface 44 can include any suitable device that enables such communication, such as a modem or a serial port. In some embodiments, the input devices 46 include one or more sensing components of the apparatus 10 (e.g., detector 16, pressure transmitter 18, and differential-pressure transmitter 20) and the output devices 48 include displays, printers, and storage devices that allow output of data received or generated by the computer 22. Input devices 46 and output devices 48 may be provided as part of the computer 22 or may be separately provided.

Further, while the computer 22 could be located with the fluid conduit 12 and sensing components of the apparatus 10 as a unitary system (e.g., a flowmeter), the computer 22 could also be located remote from the other components. Further, the computer 22 could be provided as a distributed system with a portion of the computer 22 located with the sensing components at the fluid conduit 12 and the remaining portion of the computer 22 located remote from the fluid conduit 12.

Some embodiments of the present technique include mathematical analysis of multiphase flowmeter data to consider measurements linked to flowing fractions and flow velocity, indicative of the nature of a multiphase flow through the meter. Indicators of flowing fractions vary depending on the metering technology used and can, for instance, include gamma densitometry measurements or electromagnetic measurements. An indicator of flow velocity used in some multiphase flowmeters is a differential-pressure measurement, which may be taken across a flow restriction or expansion (e.g., a Venturi tube). Computed flow rates could also be used rather than raw measurements.

Figure 3:
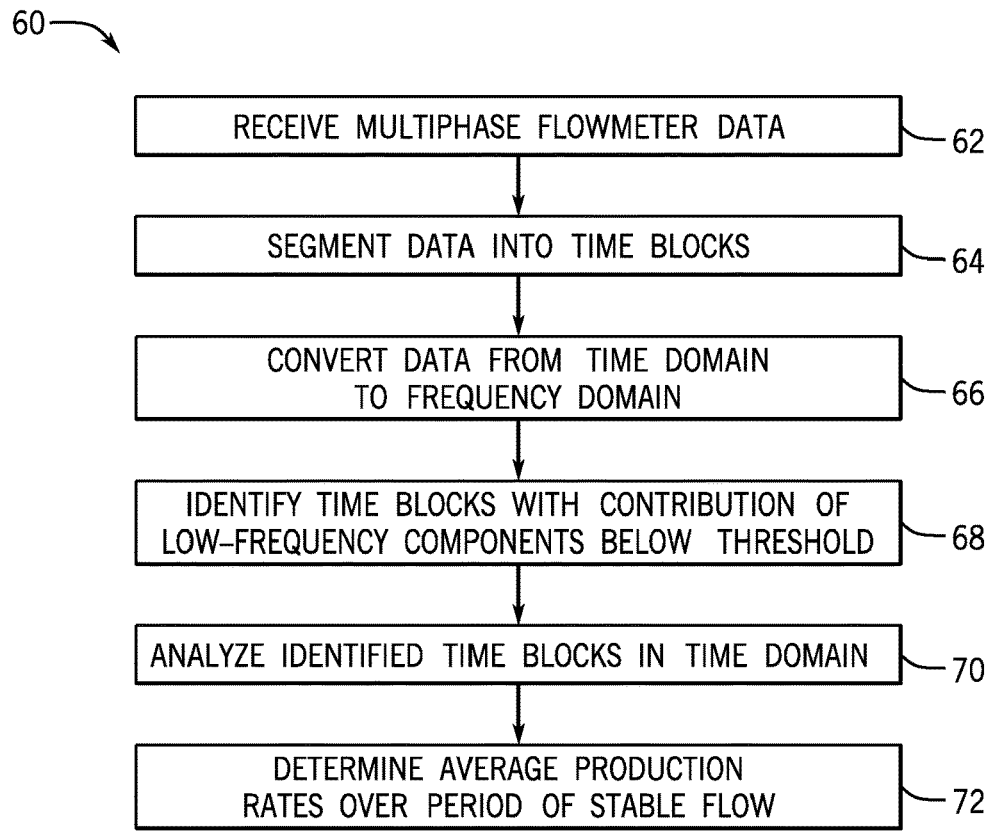
FIG. 3 is a flowchart for analyzing flowmeter data to identify stable flow through a flowmeter in accordance with an embodiment.
Figure 4:
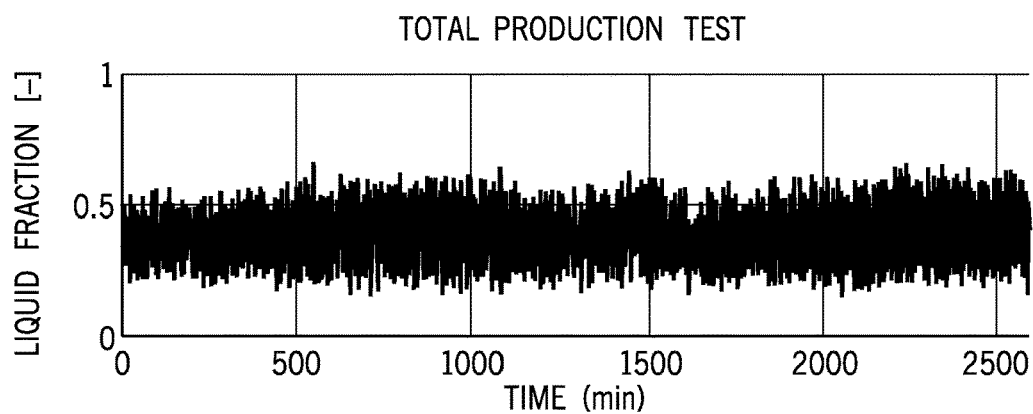
FIG. 4 is a graph of a liquid fraction of a multiphase fluid flowing through a flowmeter during a first production test in accordance with an embodiment.

Turning now to FIG. 3, an example of a process for identifying stable flow through a flowmeter is generally represented by flowchart 60. In this embodiment, multiphase flowmeter data is received (block 62) and then segmented into time blocks (block 64). The received flowmeter data can include data representative of a characteristic of a fluid flowing through the flowmeter (e.g., apparatus 10) and collected by sensing components of the flowmeter, such as photon count data or differential pressure, over a period of time. In some instances, the period of time may correspond to a well production test and the present technique may be used to identify stable flow of the produced fluid during the well production test. In a further example provided below, the data is segmented into time blocks that are two hours long, but the data could be segmented into time blocks of any desired length. The segmented time blocks may also be overlapping (with portions of consecutive time blocks spanning the same elapsed time) or separate (with consecutive time blocks having no overlap).

The multiphase flowmeter data in the time blocks are then converted from the time domain to the frequency domain (block 66). This conversion may be performed in any suitable manner, such as with a Fast Fourier Transform or another Fourier Transform. The converted data includes low-frequency and high-frequency components that may be defined with respect to a frequency threshold (i.e., with low-frequency components below the frequency threshold and high-frequency components above). The frequency threshold (like other thresholds described below, such as contribution and variance thresholds) may be a pre-defined, arbitrarily set threshold. The time blocks converted to the frequency domain can be analyzed to determine the number of low-frequency components present. The presence of a large number of low-frequency components (e.g., a quantity above a contribution threshold) would indicate long-term trends in the system and represent unstable flow. Accordingly, the process includes identifying time blocks with contributions of low-frequency components in the frequency domain below a contribution threshold (block 68). The identified time blocks are also analyzed in the time domain to determine whether measurement distribution in the multiphase flowmeter data of the identified time blocks represents stable flow of the multiphase fluid through the multiphase flowmeter (block 70). In at least some instances, the analysis of block 70 in the time domain of the identified time blocks is performed after the identification of block 68 in the frequency domain, although this order could be changed or the analyses in the time and frequency domains could be performed in parallel. In still other embodiments, flow stability analysis could be performed with just one of time domain analysis or frequency-domain analysis, rather than both. For example, the conversion and identification of blocks 66 and 68 could be omitted in an embodiment, while the time-domain analysis of block 70 could be omitted in another. Additionally, in the case of a production test and an identification of stable flow, average production rates over a period of stable flow may also be determined (block 72).

In a more specific example of the process described above with respect to flowchart 60, and in accordance with an embodiment, a method for analyzing data from a production test and identifying stable flow may include segmenting the data to be analyzed in segments (i.e., time blocks) of pre-defined duration, which could be selected based on specific sub-sets of the test data. The segments can be separated (i.e., non-overlapping), but considering overlapping blocks increases the time resolution of the analysis. For instance, segments of two hours can be built in fifteen minute intervals (from time 0:00 to 2:00, 0:15 to 2:15, 0:30 to 2:30, and so forth). For each segment, the data may be converted from the time domain to the frequency domain, for instance using a Fast Fourier Transform (FFT) to represent the same data in terms of a series of sinusoidal functions with various frequencies and amplitude. The method of an embodiment also includes checking for the presence of a significant contribution of low-frequency terms indicative of long-term trends in the system (non-developed flow) by comparing the amplitude of the Fourier transform below a given cut-off frequency to a pre-defined threshold. If the logical check does return a positive response (i.e., presence of significant low-frequency components in the signal), the flow can be considered as being in transient state and thus not stabilized.

Assuming that the production test has not been ruled out as unstable from the first check, a second analysis can be performed using the same logic of data segmentation. This time, the analysis can be performed using the time-domain subsets to analyze the stability of measurements distribution. In an embodiment, this includes using each subset of points for at least some of the time blocks to build a probability distribution function (PDF) by binning the multiphase flowmeter data of the blocks against ranges of values and matching the probability density function for each block to a theoretical kernel density estimate function (KDE) extrapolating discrete, finite measurements to a continuous function. Global and local peaks of the KDE may be identified, and the corresponding value of those peaks between different blocks may be tracked. The method may also include computing the variations of those peak values between time steps, which may be compared to a pre-defined variance threshold to determine whether such variation is within a desired range (i.e., below the variance threshold). If a pre-determined number of successive blocks show that variations remain with the desired limits for the various data types considered (e.g., measurements linked to flowing fraction and flow velocity) then the flow can be considered as fully developed and representative of long-term stabilized production behavior. In other instances, probability-averaged values of the KDEs in intervals around the peaks (e.g., five to ten percent on either side of the peak) can be considered, rather than single points. The method can also include determining average production rates over a period of stable flow identified through the above analysis of the variations.

Figure 6:
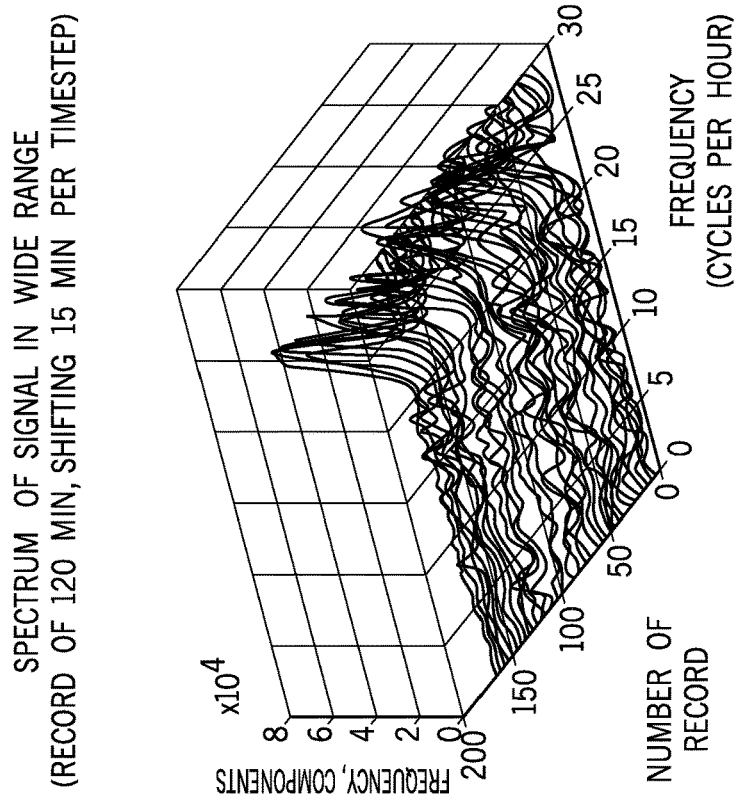
FIGS. 5 and 6 are graphs of multiphase flowmeter data of the first production test segmented into time blocks and converted into a frequency domain in accordance with an embodiment.
Figure 5:
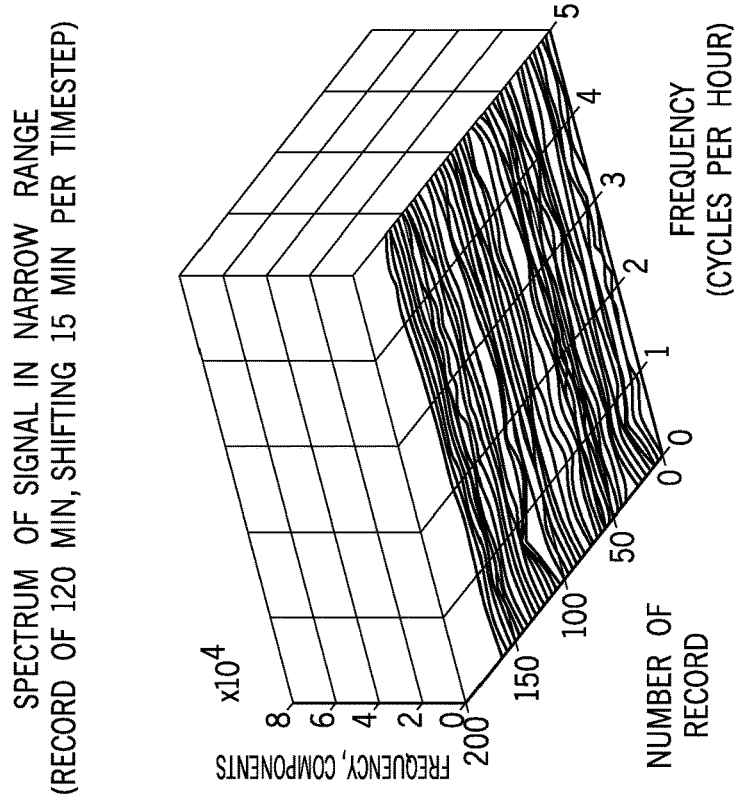
Figure 7:
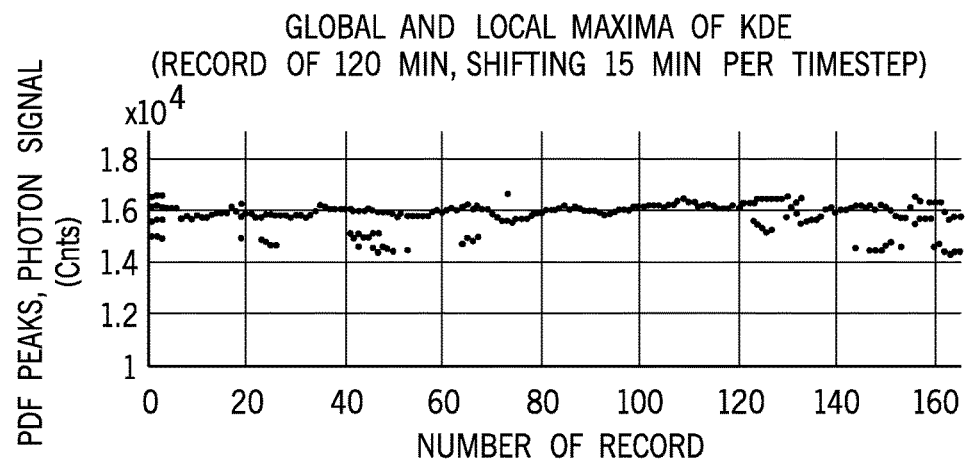
FIGS. 7 and 8 depict global and local maxima of kernel density estimate functions for the time blocks and generally show variation in these maxima between analyzed time blocks of the first production test in accordance with an embodiment.

The presently disclosed techniques may be better understood with reference to FIGS. 4-8 corresponding to a first production test and FIGS. 9-17 corresponding to a second production test. With respect to the first production test, FIG. 4 charts a measured liquid fraction of a multiphase fluid produced from a well and routed through the flowmeter over time. Data, such as photon counts or differential-pressure measurements, representative of a flow characteristic can be segmented into time blocks and converted from the time domain to the frequency domain, as described above. FIGS. 5 and 6 depict segmented time blocks (referred to as records in these figures) of flowmeter data converted into the frequency domain. While the data of each segmented time block (or record) may be converted into the frequency domain, for the sake of clarity FIGS. 5 and 6 depict just a representative sample of the converted time blocks. The time blocks can also be analyzed in the time domain to analyze flow stability, such as by analyzing peaks of kernel density estimate functions for the time blocks, which are generally depicted in FIG. 7 (for a photon count data signal) and in FIG. 8 (for a differential-pressure data signal).

Figure 8:
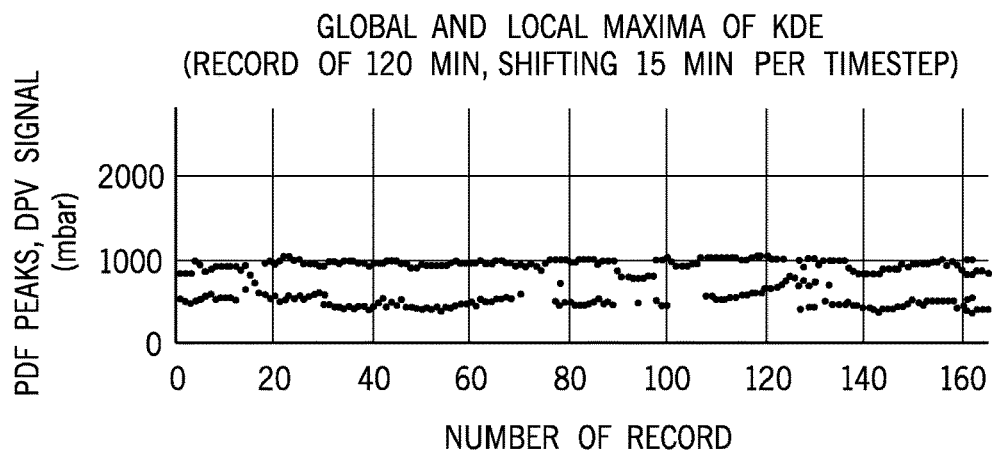

As generally noted above, flows that appear to be unstable over short periods of time (i.e., showing large variations in responses between successive time steps) may in fact be showing a pseudo steady-state behavior that is characteristic of developed flows, with a repeating behavior over the long term truly representative of a well or pipeline performance. FIGS. 4-8 generally depict an example of a production test flow showing significant variations in the time domain (in FIG. 4), but that is, in fact, just affected by high-frequency variations with no underlying low-frequency trends (as represented in FIGS. 5 and 6) and shows stable (pseudo steady-state) responses over time (as represented in FIGS. 7 and 8).

Figure 9:
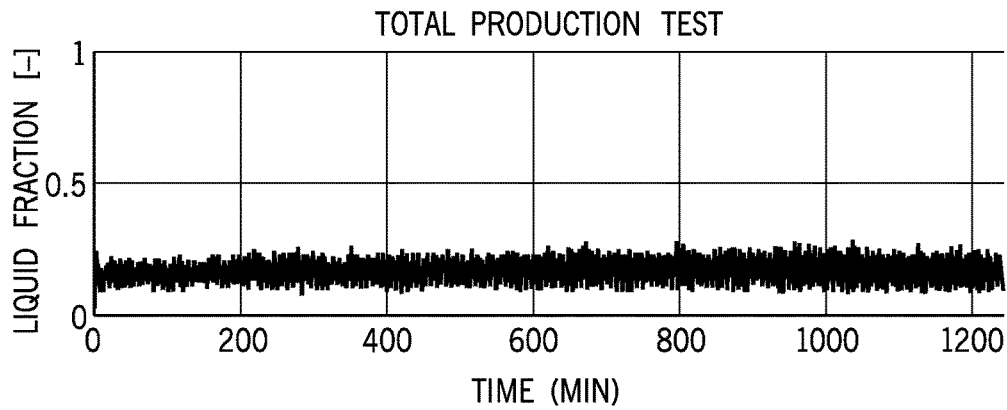
FIG. 9 is a graph of a liquid fraction of a multiphase fluid flowing through a flowmeter during a second production test, which exhibits a strong oscillating behavior, in accordance with an embodiment.
Figure 11:
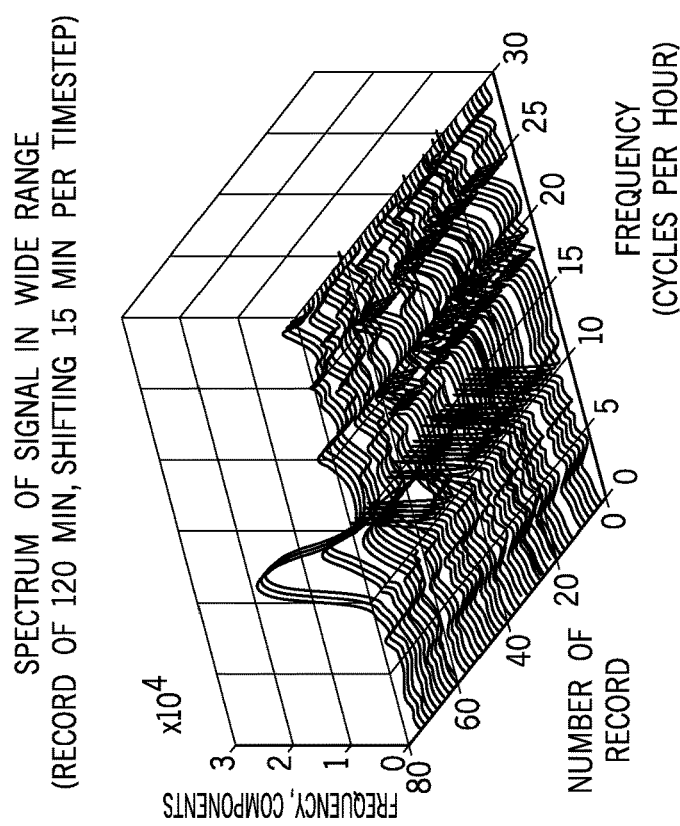
FIGS. 10 and 11 are graphs of multiphase flowmeter data of the second production test segmented into time blocks and converted into a frequency domain in accordance with an embodiment.
Figure 10:
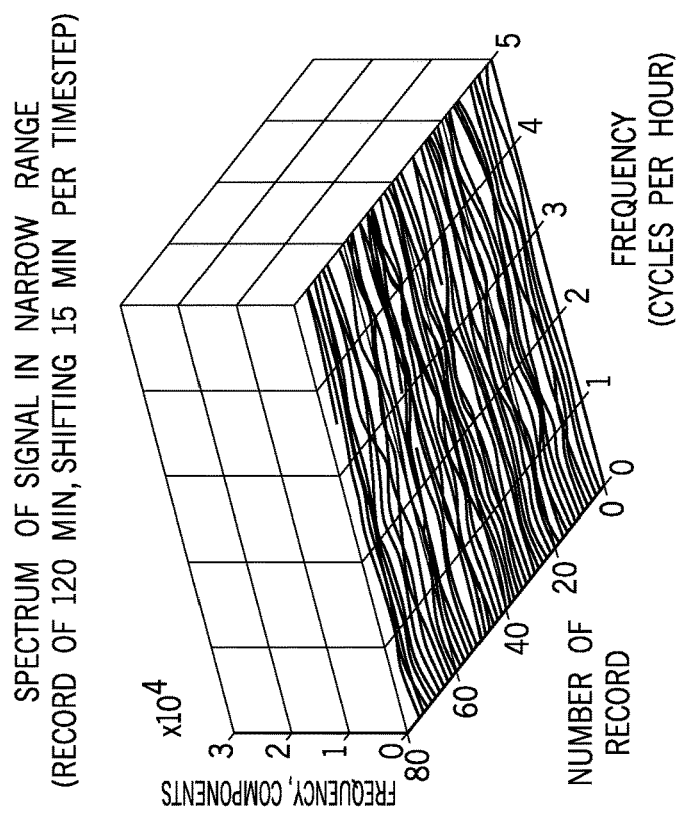
Figure 12:
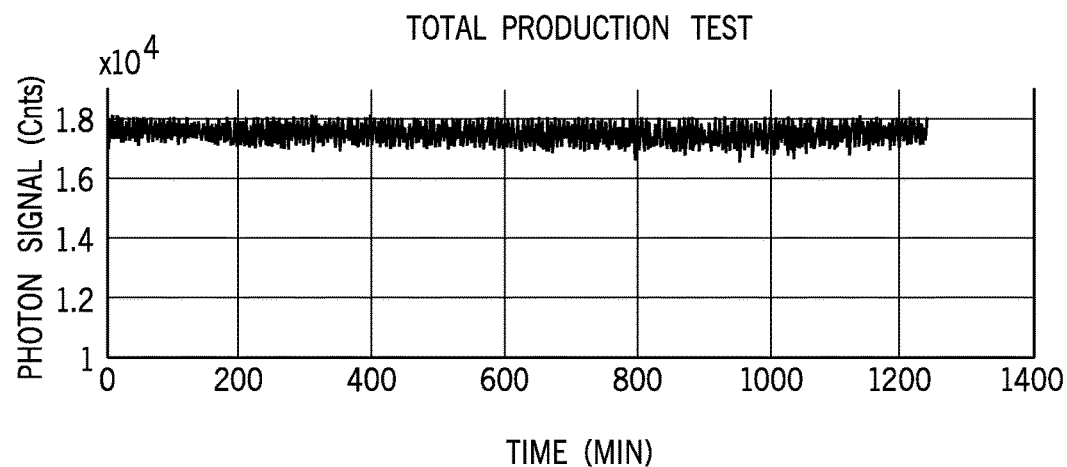
FIGS. 12 and 13 depict a photon data signal and a differential-pressure data signal of a multiphase flowmeter during the second production test in accordance with an embodiment.
Figure 13:
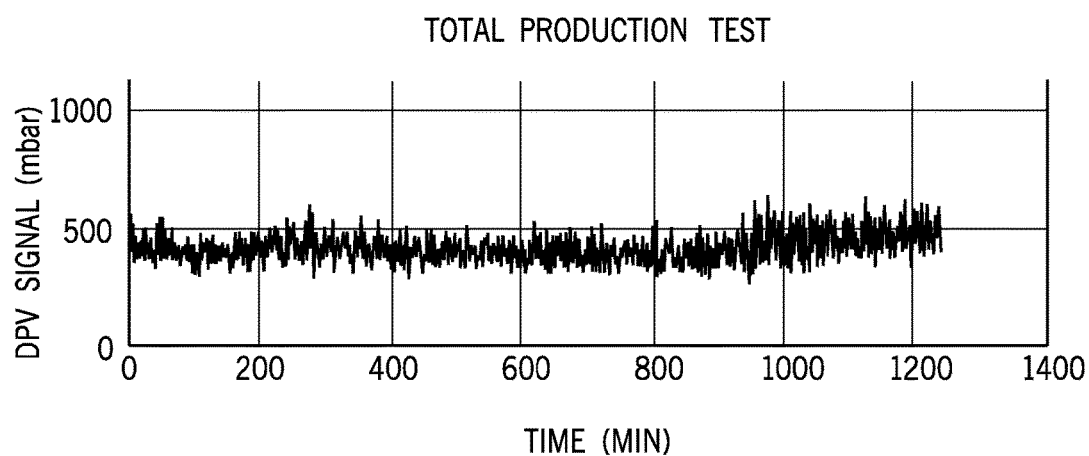
Figure 14:
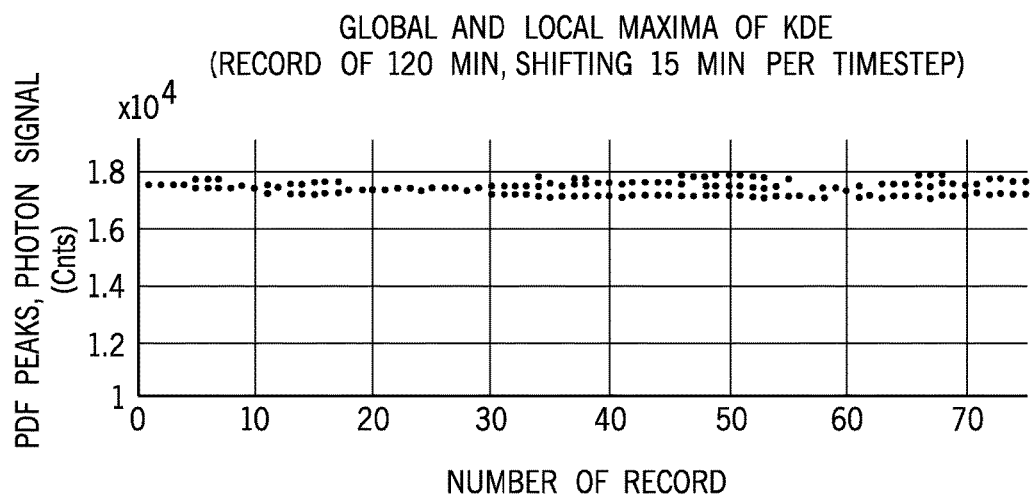
FIGS. 14 and 15 depict global and local maxima of kernel density estimate functions for the time blocks based on the photon signal and the differential-pressure data signal of FIGS. 12 and 13, and generally show variation in these maxima between analyzed time blocks in accordance with an embodiment.
Figure 15:
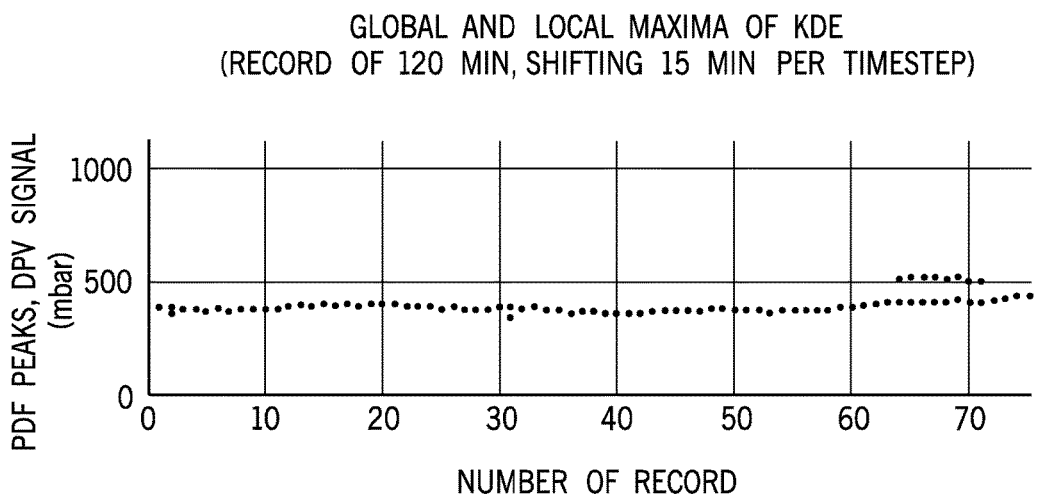
Figure 16:
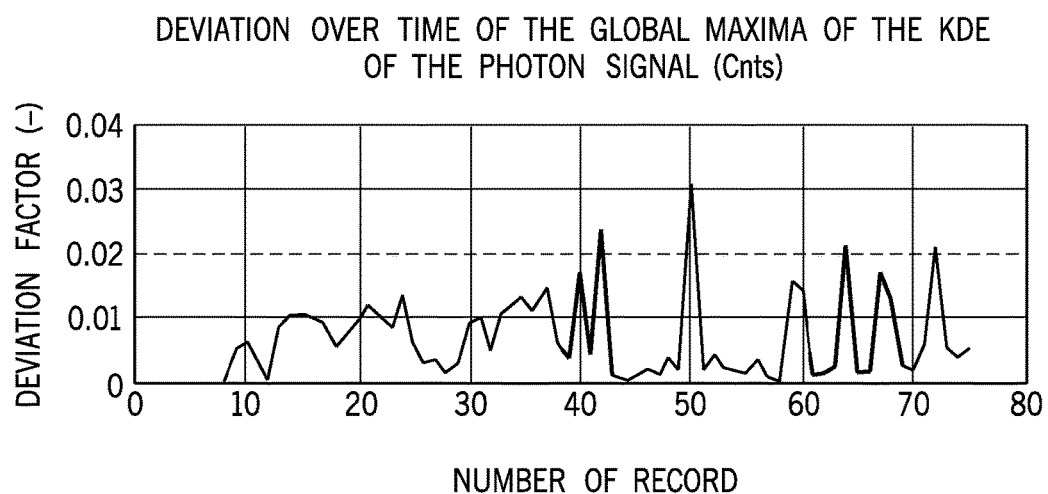
FIGS. 16 and 17 depict measured deviation of the global maxima of FIGS. 14 and 15 over time in accordance with an embodiment.
Figure 17:
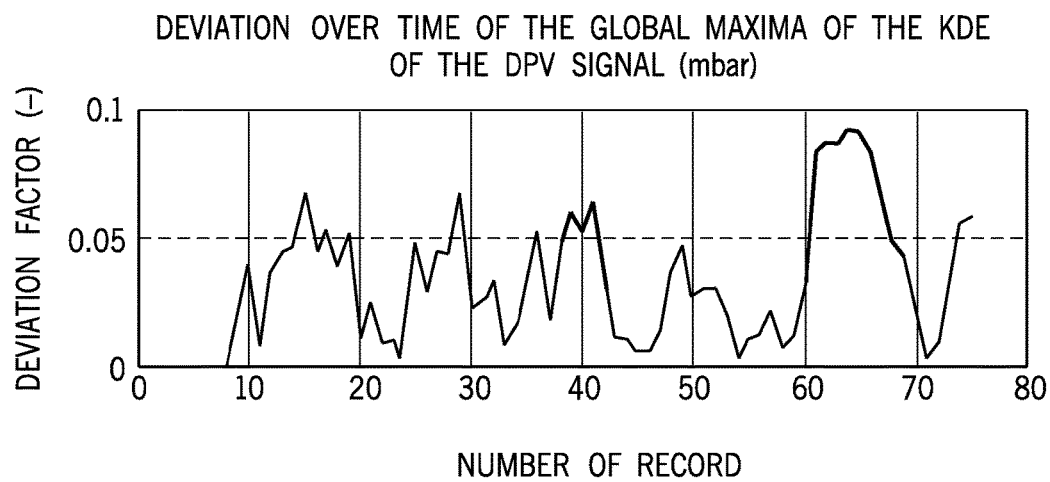

With respect to the second production test example, FIG. 9 charts a measured liquid fraction of a multiphase fluid produced from a well and routed through the flowmeter over time. Data representative of a flow characteristic, such as photon counts or differential-pressure measurements (which are depicted in FIGS. 12 and 13), can be segmented into time blocks and converted from the time domain to the frequency domain, as described above. Like FIGS. 5 and 6 with respect to the first production test example, FIGS. 10 and 11 depict segmented time blocks of flowmeter data of the second production test converted into the frequency domain. Again, while the data of each segmented time block may be converted into the frequency domain, for the sake of clarity FIGS. 10 and 11 depict just a representative sample of the converted time blocks. The time blocks can also be analyzed in the time domain to analyze flow stability, such as by analyzing peaks of kernel density estimate functions for the time blocks, which are generally depicted in FIG. 14 (for the photon count data signal of FIG. 12) and in FIG. 15 (for the differential-pressure data signal of FIG. 13). Additionally, FIGS. 16 and 17 represent deviation of the peaks of FIGS. 14 and 15 over time.

In the second production test example corresponding to FIGS. 9-17, the flow behavior is characterized by a strong oscillating behavior of the flowing fractions, as generally represented by the oscillating liquid fraction signal depicted in FIG. 9. After performing the above-described frequency-domain analysis of segmented time blocks, however, it is apparent (see, e.g., FIGS. 10 and 11) that the data bears very little low-frequency content across the entire test duration and cannot be considered as transient. Furthermore, applying the secondary, time-domain analysis described above for photon counts indicative of flowing fractions (FIGS. 12, 14, and 16) and for differential pressure indicative of flow velocity (FIGS. 13, 15, and 17), it is apparent that throughout most of the test the nature of flow remains very stable, as shown by the stability of peak values (FIGS. 14 and 15) and the small deviations observed in the location of those peaks. As generally noted above, deviation of the peak values may be compared to variance thresholds, such as two percent for the photon signal (as represented by the horizontal, dashed line in FIG. 16) and five percent for the differential-pressure signal (as represented by the horizontal, dashed line in FIG. 17). This allows for an automatic definition of stable periods, such as periods in which neither variance threshold is exceeded or in which one or both variance thresholds are exceeded for a limited period (e.g., for one or two records) before the deviations of the peak values fall back below the thresholds. In at least some embodiments, the deviation data could be filtered or smoothed for analysis to reduce impact of data spikes. For example, the deviation analysis could use averages over several records or accumulations of deviations over several records (in which successive deviations of equal magnitude but in opposite directions would cancel one another). Variance is plotted in FIGS. 16 and 17 as an absolute value representing the magnitude (but not the direction) of change, but it will be appreciated that the direction of change could also be considered.

The data acquisition system can be linked to a flow control system, making it possible to perform a sequence of tests without any human intervention to determine whether a production test can be considered as completed or not, as well as minimize test time and ensure the production test is representative. The example above also shows a secondary application of frequency-domain analysis, which lies in the determination of the characteristic frequency or frequencies of a reservoir-well-pipeline system that are of particular interest for flow assurance purposes.

In at least some embodiments, the frequency-domain analysis of segmented time blocks described above can also be used to identify a stable developed slug flow during a production test. For example, the frequencies in the two to ten cycle per hour range can be counted. The presence of many components (e.g., above a pre-defined threshold, like 10,000 components) at a frequency within this range indicates slug-like behavior of the flow. If the peaks of the frequency-domain data are also constant over time, the flow can be defined as a stable developed slug flow. Further, the location of such peaks indicates the slug frequency of the flow. By way of example, in FIG. 11 the presence of peaks at about nine cycles per hour indicates a stable developed slug flow during the second production test, with a slug frequency of about nine cycles per hour. Accordingly, the methods described above may also include identifying a stable developed slug flow during a production test. Further, the methods may include identifying a slug frequency of a multiphase fluid from multiphase flowmeter data in the frequency domain.

The foregoing outlines features of several embodiments so that those skilled in the art may better understand aspects of the present disclosure. Those skilled in the art should appreciate that they may readily use the present disclosure as a basis for designing or modifying other processes and structures for carrying out the same purposes or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

The invention claimed is:

1. A method for improving an accuracy of a machine in performing a well production test, the method comprising:
    receiving multiphase flowmeter data representative of a characteristic of a multiphase fluid flowing through a multiphase flowmeter;
    segmenting, by executing an instruction with a processor, the multiphase flowmeter data into time blocks;
    reducing misclassification errors in classifying a stability of the flow of the multiphase fluid through the multiphase flowmeter and identifying a representative sample of the flow for the well production test by:
        converting, by executing an instruction with the processor, the multiphase flowmeter data in at least some of the time blocks from a time domain to a frequency domain, the multiphase flowmeter data in the frequency domain including low-frequency components, which are below a frequency threshold, and high-frequency components, which are above the frequency threshold;
        performing, by executing an instruction with the processor, a first comparison of a contribution of the low-frequency components in the frequency domain relative to a contribution threshold to classify the flow as a stable flow or an unstable flow, the time blocks having the contribution of low-frequency components below the contribution threshold classified as representing the stable flow and the time blocks having the contribution of low-frequency components above the contribution threshold classified as representing the unstable flow;
        verifying the classification of the time blocks having the contribution of the low-frequency components above the contribution threshold as representing the unstable flow by performing, by executing an instruction with the processor, a second comparison of the multiphase flowmeter data in the frequency domain to a frequency cutoff threshold; and
        one of maintaining or adjusting, by executing an instruction with the processor, the classification of the time blocks classified as representing unstable flow based on the second comparison; and
    analyzing, by executing an instruction with the processor, flow stability of the flow based on the time blocks classified as representing stable flow in the time domain.

2. The method of claim 1, wherein receiving multiphase flowmeter data representative of the characteristic of the multiphase fluid flowing through a multiphase flowmeter includes receiving multiphase flowmeter data representative of a characteristic of a multiphase formation fluid produced from a well during the well production test.

3. The method of claim 2, wherein:
    analyzing the flow stability of the flow based on the time blocks classified as representing stable flow in the time domain includes analyzing the time blocks classified as representing stable flow to determine whether measurement distribution in the multiphase flowmeter data of the analyzed time blocks represents stable flow of the multiphase formation fluid produced from the well during the well production test.

4. The method of claim 3, further including identifying a period of stable flow of the multiphase formation fluid produced from the well during the well production test.

5. The method of claim 2, further comprising determining average production rates of the multiphase formation fluid over an identified period of stable flow.

6. The method of claim 1, wherein converting the multiphase flowmeter data in the at least some of the time blocks from the time domain to the frequency domain includes converting the multiphase flowmeter data in the at least some of the time blocks from the time domain to the frequency domain using a Fast Fourier Transform.

7. The method of claim 1, wherein performing the first comparison includes comparing amplitudes of the low frequency components to the contribution threshold.

8. The method of claim 1, wherein analyzing the flow stability of the flow based on the time blocks classified as representing stable flow in the time domain includes:
   building a probability distribution function for the analyzed time blocks by binning the multiphase flowmeter data of the at least some of the analyzed time blocks against ranges of values;
   matching the probability distribution functions to theoretical kernel density estimate functions;
   identifying peaks of the theoretical kernel density estimate functions; and
   determining whether variation in the identified peaks between time blocks is below a variance threshold.

9. The method of claim 1, wherein segmenting the multiphase flowmeter data into the time blocks includes segmenting the multiphase flowmeter data into overlapping time blocks.

10. The method of claim 1, further comprising identifying a slug frequency of the multiphase fluid flowing through the multiphase flowmeter from the multiphase flowmeter data in the frequency domain.

11. A method for improving an accuracy of a machine in performing a well production test, the method comprising:
   segmenting, by executing an instruction with a processor, measurements acquired with a multiphase flowmeter in a time domain and a frequency domain, the measurements indicative of a flow characteristic of a fluid routed through the multiphase flowmeter during the well production test;
   reducing misclassification errors in classifying a stability of the flow of the fluid through the multiphase flowmeter and identifying a representative sample of the flow for the well production test by:
      performing, by executing an instruction with the processor, a first comparison of a contribution of low-frequency components in the frequency domain relative to a contribution threshold to identify the flow as a stable flow or an unstable flow;
      classifying, by executing an instruction with the processor, (1) the flow as the stable flow when the contribution of the low-frequency components is below the contribution threshold and (2) the flow as the unstable flow when the contribution of the low-frequency components is above the contribution threshold;
      verifying the classification of the flow as the unstable flow by performing, by executing an instruction with the processor, a second comparison of the multiphase flowmeter data in the frequency domain to a frequency cutoff threshold; and
      one of maintaining or adjusting, by executing an instruction with the processor, the classification of the flow as unstable flow based on the second comparison; and
   analyzing, by executing an instruction with the processor, flow stability of the flow based classification of the flow as stable flow in the time domain.

12. The method of claim 11, wherein segmenting the measurements includes segmenting the measurements into time blocks of at least two hours.

13. The method of claim 12, wherein segmenting the measurements includes segmenting the measurements into overlapping time blocks of at least two hours.

14. The method of claim 11, further comprising identifying a stable developed slug flow of the fluid during the production test based on the second comparison.

* * * * *